T866,013

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 701

657,707

CRYSTALLINE POLYSTYRENE GRAFT COPOLYMERS AND THEIR PREPARATION

Donald J. Shields, P.O. Box 511, Kingsport, Tenn. 37662; James E. Guillet, 31 Lagebrush Lane, Don Mills, Ontario, Canada; and Harry W. Coover, Jr., P.O. Box 511, Kingsport, Tenn. 37662

Continuation of application Ser. No. 530,352, Feb. 28, 1966, which is a continuation-in-part of application Ser. No. 791,531, Feb. 6, 1959. This application Aug. 1, 1967. Published Sept. 16, 1969

Int. Cl. C08f *19/04, 1/42*

U.S. Cl. 260—878

No Drawing. 10 Pages Specification

Crystallizable, homogeneous graft copolymers of styrene are produced by contacting styrene with a catalytic mixture containing trialkyl aluminum wherein the alkyl groups are of 1 to 12 carbon atoms and vanadium trihalide, prior to any substantial reaction between said trialkyl aluminum and said vanadium trihalide, to form a reaction mixture containing a "living," solid polystyrene onto which α-monoolefinic hydrocarbons of up to 10 carbon atoms may be polymerized to form a graft copolymer. Polymerization of the styrene in the initial step can be conducted in the presence or absence of an inert diluent at a temperature of 0–250° C., preferably 60–250° C. and a pressure in a range of 0–1000 p.s.i.g. or greater, preferably 300–1000 p.s.i.g. The reaction time is ordinarily within the range of 0.5 to 5 hours. The preferred catalyst is a mixture of triethyl aluminum and vanadium trichloride. The graft copolymerization reaction can be carried out at temperatures similar to those employed for the pre-polymerization of the styrene. The preferred α-olefinic hydrocarbons graft-copolymerized onto the polystyrene are ethylene and propylene.